(12) United States Patent
Akkapeddi et al.

(10) Patent No.: US 6,740,698 B2
(45) Date of Patent: May 25, 2004

(54) OXYGEN SCAVENGING HIGH BARRIER POLYAMIDE COMPOSITIONS FOR PACKAGING APPLICATIONS

(75) Inventors: Murali K. Akkapeddi, Morristown, NJ (US); Timothy J. Kraft, Pompton Plains, NJ (US); Edward P. Socci, Stewartsville, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/971,171

(22) Filed: Oct. 4, 2001

(65) Prior Publication Data

US 2002/0099125 A1 Jul. 25, 2002

Related U.S. Application Data

(62) Division of application No. 09/562,249, filed on May 2, 2000, now Pat. No. 6,423,776.

(51) Int. Cl.[7] ............................. C08K 3/34; C08K 5/098
(52) U.S. Cl. ........................ 524/394; 524/398; 524/399; 524/400; 524/442; 524/445; 524/447
(58) Field of Search ................................. 524/394, 398, 524/399, 400, 442, 445, 447

(56) References Cited

U.S. PATENT DOCUMENTS

| 5,506,299 | A | * | 4/1996 | Gelles et al. | .................. 525/66 |
| 6,258,883 | B1 | * | 7/2001 | Ebner et al. | ................ 524/413 |
| 6,406,766 | B1 | * | 6/2002 | Rotter et al. | ............... 428/35.7 |

* cited by examiner

*Primary Examiner*—Ana L. Woodward
(74) *Attorney, Agent, or Firm*—Margaret S. Millikin; Virginia Szigeti

(57) ABSTRACT

Oxygen barrier polyamide compositions exhibiting high oxygen scavenging capability suitable for extended shelf-life packaging applications. Thus a polyamide composition comprises a polyamide homopolymer, copolymer, or blends thereof, and at least one polyamide reactive, oxidizable polydiene or oxidizable polyether. The polyamide products are particularly suited to making barrier packaging articles such as monolayer or multi-layer films, sheets, thermoformed containers and coinjection/coextrusion blow molded bottles comprising PET, polyolefin or polycarbonate as structural layers. Such articles are useful in a variety of oxygen-sensitive food, beverage, pharmaceutical and health care product packaging applications.

21 Claims, 2 Drawing Sheets

OXYGEN SCAVENGING HIGH BARRIER POLYAMIDE COMPOSITIONS FOR PACKAGING APPLICATIONS

This application is a divisional application Ser. No. 09/562,249 filed May 2, 2000, now U.S. Pat. No. 6,423,776.

BACKGROUND OF THE INVENTION

1. Field of the Invention

The present invention relates to oxygen barrier polyamide compositions exhibiting high oxygen scavenging capability suitable for extended shelf-life packaging applications. The polyamide products are particularly suited for producing barrier packaging articles such as monolayer or multi-layer films, sheets, thermoformed containers and coinjection/coextrusion blow molded bottles comprising polyethylene terephthalate (ET), polyolefin or polycarbonate as structural layers. Such articles are useful in a variety of oxygen-sensitive food, beverage, pharmaceutical, and health care product packaging applications.

2. Description of the Related Art

It is well known in the art to provide polyamide based packaging articles such as films, bottles and containers, which are useful for food packaging. Many such articles are made of multiple layers of different plastics in order to achieve the desired barrier properties. For example, U.S. Pat. Nos. 5,055,355 and 5,547,765 teach laminates of polyamides and ethylene vinyl alcohol copolymers which have good oxygen barrier properties.

In order to enhance freshness preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a shaped container body. It is known to include an oxygen scavenger in sheet material. The oxygen scavenger reacts with oxygen that is trapped in the package or that permeates into the package. This is described, for instance, in U.S. Pat. Nos. 4,536,409 and 4,702,966. U.S. Pat. No. 4,536,409, for example, describes cylindrical containers formed from such sheet material.

Various types of oxygen scavengers have been proposed for this purpose. U.S. Pat. No. 4,536,409 recommends potassium sulfite as an oxygen scavenger. U.S. Pat. No. 5,211,875 discloses the use of unsaturated hydrocarbons as oxygen scavengers in packaging films. It is known in the art that ascorbic acid derivatives as well as sulfites, bisulfites, phenolics, etc. can be oxidized by molecular oxygen, and can thus serve as an oxygen scavenging material. U.S. Pat. No. 5,075,362 discloses the use of ascorbate compounds in containers as an oxygen scavengers. U.S. Pat. Nos. 5,202,052 and 5,364,555 describe polymeric material carriers containing oxygen scavenging material. These polymeric carriers for the oxygen scavenging material include polyolefin, PVC, polyurethanes, EVA and PET. U.S. Pat. Nos. 5,021,515, 5,049,624 and 5,639,815 disclose packaging materials and processes therefor which utilize a polymer composition which is capable of scavenging oxygen; such compositions include an oxidizable organic polymer component, preferably a polyamide (preferably MXD6) and a metal oxidation promoter (such as a cobalt compound). These compositions can be used with PET, for example.

U.S. Pat No. 5,529,833 describes the use a composition comprising an ethylenically unsaturated hydrocarbon oxygen scavenger which is incorporated into a film layer and used for making packaging for oxygen sensitive products. The oxygen scavenger is catalyzed by a transition metal catalyst and a chloride, acetate, stearate, palmitate, 2-ethylhexanoate, neodecanoate or naphthenate counterion. Preferred metal salts are selected from cobalt (II) 2-ethylhexanoate and cobalt (II) neodecanoate. Because water deactivates the oxygen scavenger composition, the composition can only be used for packaging for dry materials.

There remains a need for the selection of a substrate which can provide oxygen scavenging in order to reduce the oxidation of the constituents contained therein. Accordingly, it is an object of the invention to provide an improved oxygen scavenging blend for use in coating substrates for food packaging applications.

The present invention provides a single polyamide layer which is an effective oxygen barrier as well as a multiple layered structure formed from the polyamide layer to provide even more effective oxygen barrier properties. These high oxygen barrier polyamide compositions exhibit unusually high oxygen scavenging capability suitable for extended shelf-life, packaging applications. The oxygen scavenging polyamide compositions may be prepared by a reactive extrusion process of compounding polyamides with a small amount of a low molecular weight, oxidizable polydiene or polyether polymer. The polyamide products are particularly suited to making barrier packaging articles which are useful in a variety of oxygen-sensitive applications.

SUMMARY OF THE INVENTION

The invention provides a polyamide composition which comprises a polyamide homopolymer, copolymer, or blends thereof, and at least one polyamide reactive, oxidizable polydiene or oxidizable polyether.

The invention also provides a polyamide composition which comprises a blend of a polyamide homopolymer, copolymer, or blends thereof, and at least one polyamide reactive, oxidizable polydiene or oxidizable polyether.

The invention further provides a polyamide composition which comprises the reaction product of a polyamide homopolymer, copolymer, or blends thereof, and at least one polyamide reactive, oxidizable polydiene or oxidizable polyether.

At The invention still further provides a oxygen barrier film comprising a layer of a polyamide composition which comprises a polyamide homopolymer, copolymer, or blends thereof, and at least one polyamide reactive, oxidizable polydiene or oxidizable polyether.

The invention yet further provides a multilayer article which comprises an oxygen barrier polyamide composition layer comprising a polyamide homopolymer, copolymer, or blends thereof, and at least one polyamide reactive, oxidizable polydiene or oxidizable polyether, and a thermoplastic polymer layer on one or both sides of the polyamide composition layer.

The invention also provides a shaped article which comprises a polyamide composition which comprises a polyamide homopolymer, copolymer, or blends thereof, and at least one polyamide reactive, oxidizable polydiene or oxidizable polyether.

The invention further provides a process for producing a polyamide composition which comprises melting a polyamide homopolymer, copolymer, or blends thereof, and blending the molten polyamide homopolymer, copolymer, or blend thereof with at least one polyamide reactive, oxidizable polydiene or oxidizable polyether to form a mixture, and then cooling the mixture.

The invention also provides a process for producing an oxygen barrier polyamide film which comprises melting a polyamide homopolymer, copolymer, or blends thereof, and-blending the molten polyamide homopolymer, copolymer, or blend thereof with at least one polyamide reactive, oxidizable polydiene or oxidizable polyether to form a mixture, and then extruding, casting or blowing the mixture into a film with subsequent cooling.

The invention also provides a process for producing an oxygen barrier polyamide film which comprises melting a composition comprising a polyamide homopolymer, copolymer, or blends thereof, and at least one polyamide reactive, oxidizable polydiene or oxidizable polyether, and then extruding, casting or blowing the composition into a film with subsequent The invention also provides a process for producing a multilayer article which comprises melting a polyamide homopolymer, copolymer, or blends thereof, and blending the molten polyamide homopolymer, copolymer, or blend thereof at least one polyamide reactive, oxidizable polydiene or oxidizable polyether to form a mixture; separately melting a thermoplastic polymer composition; and then coextruding, casting, blowing, thermoforming, blow molding or coinjecting the mixture and thermoplastic polymer composition into a multilayer article, with subsequent cooling.

The invention also provides a process for producing a multilayer article which comprises melting a composition comprising a polyamide homopolymer, copolymer, or blends thereof, and at least one polyamide reactive, oxidizable polydiene or oxidizable polyether; separately melting a thermoplastic polymer composition; and then coextruding, casting, blowing, thermoforming, blow molding or coinjecting the mixture and thermoplastic polymer composition into a multilayer article, with subsequent cooling.

DETAILED DESCRIPTION OF THE PREFERRED EMBODIMENT

Figure 1:
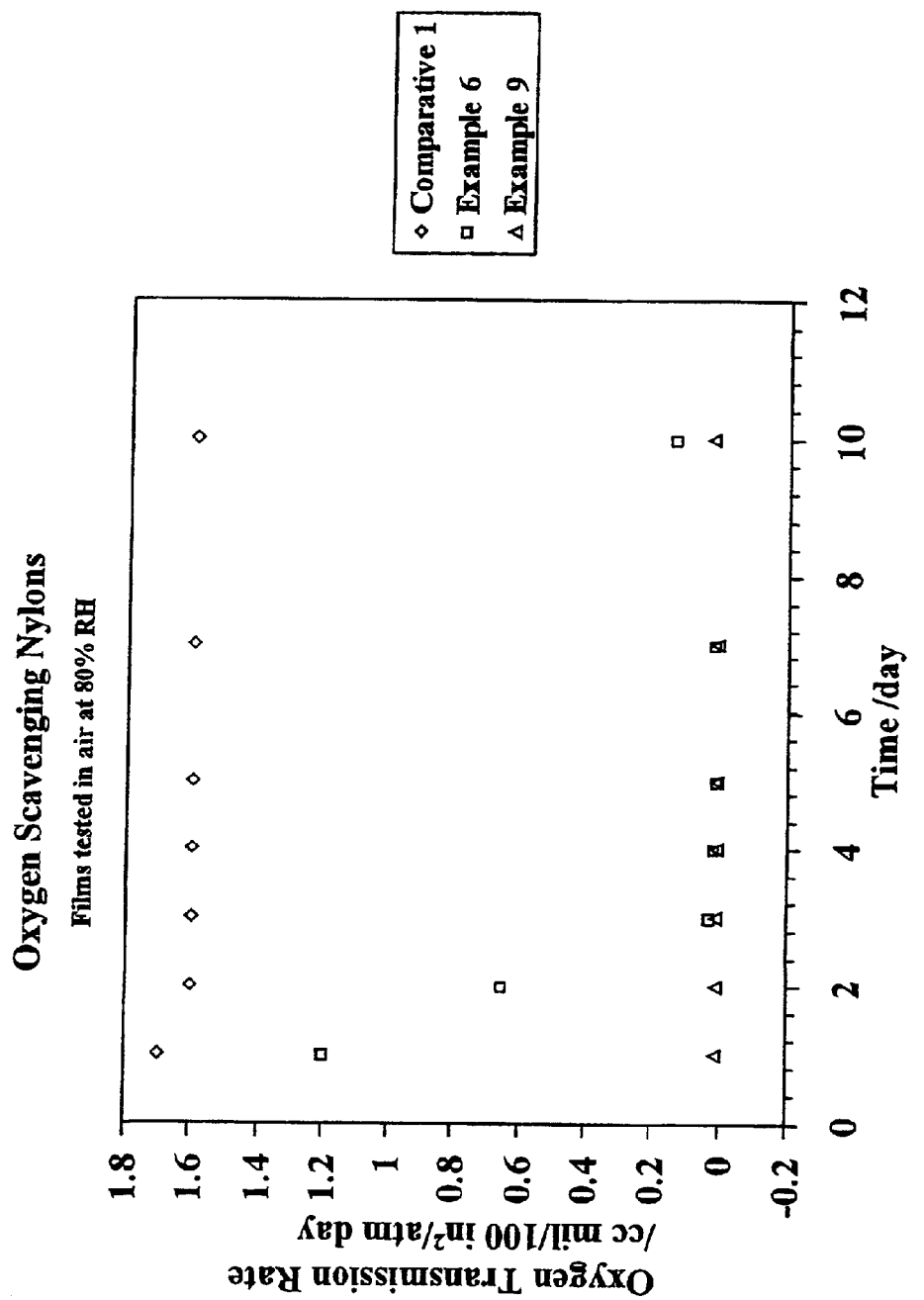
FIG. 1 shows a graph of the oxygen transmission data for Examples 6 and 9 and Comparative Example 1.

In the present invention, an improved polyamide composition is prepared by combining a polyamide homopolymer, copolymer, or blends thereof and an oxidizable polydiene or polyether. Preferably the composition also comprises a metal carboxylate salt catalyst and a nanoscale clay.

The preferred polyamide homopolymer or copolymer is selected from aliphatic polyamides and aliphatic/aromatic polyamides having a molecular weight of from about 10,000 to about 100,000. General procedures useful for the preparation of polyamides are well known to the art Useful diacids for making polyamides include dicarboxylic acids which are represented by the general formula

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula $H_2N(CH_2)_nNH_2$ wherein n has an integer value of 1–16, and includes such compounds as trimethylenediamine, tetramethylenediamine, pentamethylenediamine, hexamethylenediamine, octamethylenediamine, decamnthylenediarmine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful aliphatic polyamide homopolymers include poly (4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-amioundecanoic acid) (nylon 11), poly(12-aminododecanoic acid) (nylon 12), poly(hexamethylene adipamide) (nylon 6,6), poly (hexamethylene sebacamide) (nylon 6,10), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), poly (tetramethylene adipamide (nylon 4,6), caprolactam/ hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer, (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as blends and copolymers thereof and other polyamides which are not particularly delineated here.

Of these polyamides, preferred polyamides include polycaprolactam, which is also commonly referred to as nylon 6, and polyhexamethylene adipamide, which is also commonly referred to as nylon 6,6, as well as mixtures of the same. Of these, polycaprolactam is most preferred.

Polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®. Suitable variants of CAPRON® for use as a first polyamide in the present invention include CAPRON® 8200 nylon, a balanced nylon 6 having a formic acid viscosity (FAV) of 75, CAPRON® 1767 nylon, a balanced nylon 6 having an FAV of 35, and CAPRON® 8224HSL nylon, a heat stabilized, lubricated nylon 6 having an FAV of 60. A suitable variant of CAPRON® nylon for use as a second polyamide includes CAPRON® 1250 nylon, an amine-terminated nylon 6 with a FAV of 60 and having terminal amino groups of 70 to 78 milliequivalents per gram.

Exemplary of aliphatic/aromatic polyamides include poly (2,2,2-trimethyl hexamethylene terephthalamide), poly(m-xylylene adipamide) (MXD6), poly(p-xylylene adipamide), poly(hexamethylene terephthalamide) (nylon 6,T), poly (hexamethylene isophthalamide) (nylon 6,I), poly (dodecamethylene terephthalamide), polyamide 6T/6I, poly (tetramethylenediamine-co-isophthalic acid) (nylon 4,I), polyamide 6/MXT/I, polyamide MXDI, hexamethylene adipamide/hexamethylene-isophthalamide (nylon 6,6/6I), hexamethylene adipamide/hexamethyleneterephthalamide (nylon 6,6/6T) and as well as others which are not particularly delineated here. Blends of two or more aliphatic/aromatic polyamides and/or aliphatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

The polyamide component is present in the overall composition in an amount of from about 80% to about 99.9% by weight, preferably from about 90% to about 99%o and more preferably from about 95% to about 98%.

The composition of the current invention also contains a functional, nylon reactive, oxidizable polydiene or polyether as an oxygen scavenger. Such are low molecular weight, small particles which are compatible and uniformly dispersible in the polyamide. Preferably the nylon reactive, oxidizable polydiene or polyether comprises an epoxy or anhydride functionality such that it reacts with the carboxyl or amino end groups of the polyamide. The functionality in the polydiene or polyether may also react with amide group in the polyamide backbone. The functionality can be pendant to the backbone or at the chain ends of the polydiene or polyether. The preferred functional polydienes are functional polyalkadiene oligomers which can have the following general backbone structure.

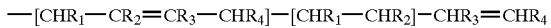

where $R_1$, $R_2$, $R_3$ and $R_4$ can be the same or different and can be selected from hydrogen (—H) or any of the lower alkyl groups (methyl, ethyl, propyl, butyl etc.). $R_2$ & R3 may also be a chloro (—Cl) group. Illustrative of the backbone structure are polybutadiene (1,4 or 1,2 or mixtures of both), polyisoprene (1,4 or 3,4), poly 2,3-dimethyl butadiene, polychloroprene, poly 2,3-dichlorobutadiene, polyallene, poly 1,6-hexatriene, etc.

Specific non-limiting examples of functional, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene.

Specific non-limiting examples of functional oxidizable polyethers as oxygen scavengers include amine, epoxy or anhydride functionalized polypropylene oxide, polybutylene oxide (2,3 or 1,2) and polystyrene oxide. The preferred oxygen scavenger is an epoxy functional polybutadiene oligomer. The oxygen scavenger is present in the polyamide composition as a large number of small particles. The molecular weight of the functional polydiene or polyether oligomer may range from about 500 about to 5,000, preferably from about 750 to about 3000 and most preferably from about 1000 to about 2000. It is present in the overall composition in an amount of from about 0.1% to about 10% by weight, preferably from about 1% to about 10% and more preferably from about 2% to about 5%. The functional, oxidizable polydiene or polyether is in the form of particles whose average particle size is in the range of from about 10 nm to about 1000 nm, wherein the particles are substantially uniformly distributed in the polyamide. The polyamide composition may comprise either a blend of the polyamide and the polydiene or polyether, or a reaction product of the polyamide with the oxidizable polydiene or polyether.

Preferably the composition further comprises a metal fatty acid salt catalyst such as a low molecular weight metal carboxylate salt catalyst. Suitable metal fatty acid salt catalysts have a counterion which is an acetate, stearate, propionate, hexanoate, octanoate, benzoate, salicylate, and cinnamate or combination thereof. Preferably the metal fatty acid salt catalyst is a cobalt, copper or ruthenium, acetate, stearate, propionate, hexanoate, octanoate, benzoate, salicylate or cinnamate, or combinations thereof The preferred metal carboxylate is cobalt, ruthenium or copper carboxylate. Of these the more preferred is cobalt or copper carboxylate and the most preferred is cobalt carboxylate. It is present in the overall composition in an amount of from about 0% to about 1% by weight, preferably from about 0.001% to about 0.5% and more preferably from about 0.005% to about 0.1%. The most preferred range is from about 0.01% to about 0.05%.

Preferably the composition further comprises a nanometer scale dispersed clay. Suitable clays are described in U.S. Pat. No. 5,747,560, which is incorporated herein by reference. Preferred clays non-exclusively include a natural or synthetic phyllosilicate such as montmorillonite, hectorite, vermiculite, beidilite, saponite, nontronite or synthetic flouromica, which has been cation exchanged with a suitable organoammonium salt. The preferred clay is montmorillonite, bectorite or synthetic flouromica. The more preferred clay is the montmorillonite or hectorite. The most preferred clay is montmorillonite. The preferred organoammonium cation for treating the clay is N,N',N",N"'Bis (hydroxyethyl), methyl, octadecyl ammonium cation or ω-carboxy alkylammonium cation, i.e., the ammonium cation derived such ω-aminoalkanoic acids as 6-amionocaproic acid, 11-aminoundecanoic acid, 12-aminododecanoic acid. The preferred fine dispersions of nanometer scale silicate platelets are obtained either via an in-situ polymerization of polyamide forming monomer(s) or via melt compounding of polyamide in the presence of the organoammonium salt treated clay. The clay has an average platelet thickness in the range of from about 1 nm to about 100 nm and an average length and average width each in the range of from about 50 nm to about 500 nm. It is present in the overall composition in an amount of from about 0% to about 10% by weight, preferably from about 2% to about 8% and more preferably from about 3% to about 6%.

The composition of the invention may optionally also include one or more conventional additives whose uses are well known to those skilled in the art The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art Such may be used in amounts of up to about 10% by weight of the overall composition.

Representative ultraviolet light stabilizers include various substituted resorcinols, salicylates, benzotriazole, benzophenones, and the like. Suitable lubricants and mold release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers include inorganic fillers, including those of fibrous and granular nature, as wells as mixtures thereof The fibrous fillers include glass, silica glass, ceramic, asbestos, alumina, silicon carbide, gypsum, metal (including stainless steel) as well as other inorganic and carbon fibers. The granular fillers include wollastonite, sericite, asbestos, talc, mica, clay, kaolin, bentonite, and silicates, including alumina silicate. Other granular fillers include metal oxides, such as alumina, silica, magnesium oxide, zirconium oxide, titanium oxide. Further granular fillers include carbonates such as calcium carbonate, magnesium carbonate, and dolomite, sulfates including calcium sulfate and barium sulfate, boron nitride, glass beads, silicon carbide, as well as other materials not specifically denoted here. These fillers may be hollow, for example glass microspheres, silane balloon, carbon balloon, and hollow glass fiber. Preferred inorganic fillers include glass fibers, carbon fibers, metal fibers, potassium titanate whisker, glass beads, glass flakes, wollastonite, mica, talc, clay, titanium oxide, aluminum oxide, calcium carbonate and barium sulfate. Particularly, glass fiber is most preferred. The inorganic fillers should preferably be treated with silane, titanate, or another conventional coupling agent, and glass fibers should preferably be treated with an epoxy resin, vinyl acetate resin or other conventional converging agent.

Preferably the polyamide compositions are produced via a melt extrusion compounding of the polyamide with the other composition components. The composition may be formed by dry blending solid particles or pellets of each of the polyamide components and then melt blending the mixture in a suitable mixing means such as an extruder, a roll mixer or the like. Typical melting temperatures range from about 230° C. to about 300° C., preferably from about 235° C. to about 280° C. and more preferably from about 240° C. to about 260° C. for nylon 6 and its copolymers. Blending is conducted for a period of time required to attain a substantially uniform blend Such may easily be determined by those skilled in the art. If desired, the composition may be cooled and cut into pellets for further processing, it may be extruded into a fiber, a filament, or a shaped element or it may be formed into films and optionally uniaxially or biaxially stretched by means well known in the art.

The barrier polyamide films and articles of this invention may be produced by any of the conventional methods of producing films and articles, including extrusion and blown film techniques, bottles via extrusion or injection stretch blow molding and containers via thermoforming techniques.

Processing techniques for making films, sheets, containers and bottles are well known in the art. For example, the polyamides may be preblended and then the blend fed into an infeed hopper of an extruder, or each polyamide may be fed into infeed hoppers of an extruder and then blended in the extruder. The melted and plasticated stream from the extruder is fed into a single manifold die and extruded into a layer. It then emerges from the die as a single layer film of nylon material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Once cooled and hardened, the result film is preferably substantially transparent.

Alternatively the composition may be formed into a film using a conventional blown film apparatus. The film forming apparatus may be one which is referred to in the art as a "blown film" apparatus and includes a circular die head for bubble blown film through which the plasticized film composition is forced and formed into a film "bubble". The "bubble" is ultimately collapsed and formed into a film.

The composition may also be used to form shaped article through any well known process, including extrusion blow molding and injection stretch-blow molding. An injection molding process softens the thermoplastic nylon blend in a heated cylinder, injecting it while molten under high pressure into a closed mold, cooling the mold to induce solidification, and ejecting the molded preform from the mold. Molding compositions are well suited for the production of preforms and subsequent reheat stretch-blow molding of these preforms into the final bottle shapes having the desired properties. The injection molded preform is heated to suitable orientation temperature in the 100° C.–150° C. range and then stretch-blow molded. The latter process consists of first stretching the hot preform in the axial direction by mechanical means such as by pushing with a core rod insert followed by blowing high pressure air (up to 500 psi) to stretch in the hoop direction. In this manner, a biaxially oriented blown bottle is made. Typical blow-up ratios range from 5/1 to 15/1.

The barrier polyamide composition of this invention may be formed as an integral layer in a multilayered film, bottle or container which include one or more layers of another thermoplastic polymer such as polyesters—particularly polyethylene terephthalate (PET) and PET copolymers, polyolefins, ethylene vinyl alcohol copolymers, acrylonitrilecopolymers, acrylic polymers, vinyl polymers, polycarbonate, polystyrene, etc. The polyamide composition of this invention is particularly suitable as a barrier layer in the construction and fabrication of multilayer bottles and thermoformed containers in which PET or polyolefin function as structural layers. Such PET/polyamide multilayer bottles can be made by coinjection stretch-blowmolding process similar to the injection-stretch blowmolding process describe before. Similarly, polyamide/polyolefin multilayer bottles can be made by coextrusion blowmolding. The latter process usually employs suitable tie layers for adhesion.

Useful polyesters for coinjection stretch blowmolding process include polyethylene terephthalate (PET) and its copolymer in the intrinsic viscosity (I.V.) range of 0.5–1.2 dlg range, more preferably in the I.V. range of 0.6 to 1.0 and most preferably in the I.V. range of 0.7–0.9. The polyolefins used in the coextrusion blowmolding include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; and polyhexene. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefins are polyethylene and polypropylene.

Copolymers of ethylene and vinyl alcohol suitable for use in the present invention can be prepared by the methods disclosed in U.S. Pat. Nos. 3,510,464; 3,560,461; 3,847,845; and 3,585,177. Additional layers may also include adhesive tie layers to tie various layers together. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169.

The multilayered barrier articles of this invention can be formed by any conventional technique for forming films, including lamination, extrusion lamination, coinjection, stretch-blow molding and coextrusion blowmolding. The preferred method for making multilayer film is by coextrusion. For example, the material for the individual layers, as well as any optional layers, are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. See for example in "Modern Plastics Encyclopedia", Vol. 56, No. 10A, pp. 131–132, McGraw Hill, October 1979. Alternatively the individual layers may first be formed into sheets and then laminated together under heat and pressure with or without intermediate adhesive layers.

Adjacent to the fluoropolymer layer is an adhesive layer, also referred to in the art as a "tie" layer, between each film layer. In accordance with the present invention, suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270 which are incorporated herein by reference. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 10 weight percent of the functional moiety, based on the total weight of the modified polyolefin. More preferably the functional moiety comprises from about 0.005 and about 5 weight percent, and most preferably from about 0.01 and about 2 weight percent. The modified-polyolefin composition may also contain up to about 40 weight percent of thermoplastic elastomers and alkyl esters as described in U.S. Pat. No. 5,139,878.

Nylon films produced according to the present invention may be oriented by stretching or drawing the films at draw ratios of from about 1.1:1 to about 10:1, and preferably at a draw ratio of from about 2:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate tan the film entering the nip rolls at an upstream location The change of rate is compensated for by stretching in the film.

The film may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction.

The thickness of the polyamide film is preferably from about 0.05 mils (1.3 $\mu$m) to about100 mils (2540 $\mu$m), and more preferably from about 0.05 mils (1.3 $\mu$m) to about 50 mils (1270 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

One noteworthy characteristic of the articles made from the compositions of this invention is that they exhibit excellent gas barrier properties, particularly oxygen barrier properties. Oxygen permeation resistance or barrier may be measured using the procedure of ASTM D-3985. In general, the films of this invention have an oxygen transmission rate ($O_2$ TR) at 90% relative humidity less than about 1.0 $cm^3$/100 $in^2$ (645 $cm^2$)/24 hrs/Atm at 23° C. and usually less than about 0.5 $cm^3$/100 $in^2$ (645 $cm^2$)/24 hrs/Atm at 23° C.

The following non-limiting examples serve to illustrate the invention.

PROCESSING DETAILS

Reactive Extrusion

Process 1: A Leistritz 18-mm co-rotating twin screw extruder equipped with a K-Tron volumetric feeder was employed. The polybutadiene (either carboxy terminated polybutadiene—Hycar, or epoxy functionalized polybutadiene—Elf-Atochem Poly BD 600/Poly BD605E) was stored in a sealed drum and metered with a Nichols-Zenith pump directly into a sealed extruder barrel directly following the feed barrel. The polybutadiene was injected prior to the first (of two) mixing zones via a Leistritz direct liquid injection nozzle. Nylon 6 pellets, or blends of nylon 6/amorphous nylon, nylon 6/EVOH, or other materials, were fed into the nitrogen-blanketed throat of the extruder at a rate of 10 pounds (22 kg) per hour. The polybutadiene was pumped at a rate such that weight percentages of 1% to 5% polybutadiene were added. The extruder was equipped-with two mixing zones consisting primarily of kneading elements. The extruder was equipped with a vacuum zone subsequent to the second mixing zone and prior to the die plate. The extrudate was quenched in a water bath and then pelletized.

Process 2: A Leistritz 18-mm co-rotating twin screw extruder equipped with a K-Tron volumetric feeder was employed. The polybutadiene (either carboxy terminated polybutadiene—Hycar, or epoxy functionalized polybutadiene—Elf-Atochem Poly BD 600/Poly BD 605E) was stored in a sealed drum and metered with a Nichols-Zenith into the extruder throat. Nylon 6 pellets or other materials were fed into the nitrogen-blanketed throat of the extruder at a rate of 5 pounds (11 kg) per hour. The polybutadiene was pumped at a rate such that weight percentages of 1% to 5% polybutadiene were added. The extruder was equipped with two mixing zones consisting primarily of kneading elements. The extrudate was quenched in a water bath and then pelletized.

Process 3: A Leistritz 18-mm co-rotating twin screw extruder equipped with a K-Tron volumetric feeder was employed. A blend of nylon 6 pellets and cobalt stearate pastilles were fed into the nitrogen-blanketed throat of the extruder at a rate of 10 pounds (22 kg) per hour. The blend consisted of 95% nylon 6 and 5% cobalt stearate. The extruder was equipped with two mixing zones consisting primarily of kneading elements. The extrudate was quenched in a water bath and then pelletized. The resulting pellet was used as a masterbatch additive in some of the processes listed below.

Process 4: A:Leistritz 18-mm co-rotating twin screw extruder equipped with a K-Tron volumetric feeder was employed. The polybutadiene (either carboxy terminated polybutadiene—Hycar, or epoxy functionalized polybutadiene—Elf-Atochem Poly BD 600/Poly BD 605E) was stored in a sealed drum vessel and metered with a Nichols-Zenith pump directly in the extruder barrel following the feed throat. The polybutadiene was injected directly into the extruder prior to the first (of two) mixing zones via a Leistritz direct liquid injection nozzle. A blend of nylon 6 and cobalt stearate masterbatch was fed into the nitrogen-blanketed throat of the extruder at a rate of 10 pounds per hour. The blend consisted of approximately 98 weight percent nylon 6 and 2 weight percent cobalt masterbatch. The polybutadiene was pumped at a rate such that weight percentages of 1% to 5% polybutadiene were added. The extruder was equipped with two mixing zones consisting primarily of kneading elements. The extruder was equipped with a vacuum zone subsequent to the second mixing zone and prior to the die plate. The extrudate was quenched in a water bath and then pelletized.

Pellet Blending

Process 5: Blending of 98 weight percent material prepared in process 1 or 2 (or other material) and 2 weight percent material prepared in process 3. Blending was accomplished by weighing out required amount of each material into a large container. The container was tumbled for approximately 5 minutes to ensure thorough mixing of the two components. These blends were used subsequently as feedstock for cast film processing.

Cast Film

Process 6: A Haake single screw extruder equipped with a six-inch (152.4 mm) wide film die was flood fed with pellets from process 3, 5 or 6. Extruder temperature was set at approximately 260° C. Extrudate passed through the slit die onto a heated Killion cast roll. Film thickness was adjusted via cast roll speed and/or screw RPM to prepare a film with typical thickness of 0.001 inch to 0.003 inch (0.0254 to 0.0762 mm).

Process 7: A Killion 1.5 inch (38.1 mm) single screw extruder equipped with a twelve-inch wide film die was flood fed with pellets from process 3, 5 or 6. Extruder temperature was set at approximately 260° C. Extrudate passed through the slit die onto a heated Killion cast roll. Film thickness was adjusted via cast roll speed and/or screw RPM to prepare a film with typical thickness of 0.001 inch to 0.003 inch (0.0254 to 0.0762 mm).

Process 8: Three Killion single screw extruders equipped with a twelve-inch wide film coextrusion die were utilized to prepare a three-layer film. One extruder was flood fed with pellets from process 5. Two extruders were flood fed with approximately 1.0 IV PET. Extruder temperatures were approximately 260° C. for pellets from process 5 and 280° C. for PET pellets. Extrudate passed through the slit die onto a heated cast roll. Film thickness was adjusted via cast roll speed and/or screw RPM to prepare a film of the following thickness: 0.004 inch (0.1016 mm) PET outer layers and 0.002 inch (0.0508 mm) active barrier nylon inner layer.

Oxygen Transmission Measurements

Oxygen transmission measurements were conducted on film samples on a Mocon Oxtran 2/20 apparatus equipped with SL sensors. Tests were conducted at 80% to 90% relative humidity in air (21% oxygen). Data were collected as a function of time and recorded in units of: cc-mil/100 $in^2$/atm day. Tests were conducted for up to 28 days.

Description of Examples

Listed in the Table are the summarized results obtained from the following examples which illustrate the effect on oxygen transmission rate of the oxygen binding system described herein.

COMPARATIVE EXAMPLES 1–8

Comparative examples 1–8 are useful as reference points or "baselines" for the examples which will be described later. Comparative example 1 is a commercial grade nylon 6 homopolymer available from Honeywell. Comparative example 2 is a nylon 6 homopolymer containing 100 ppm cobalt. Comparative example 2 illustrates that a 100 ppm addition of cobalt to nylon 6 has no affect on the oxygen transmission rate of nylon 6. Comparative example 3 is a nylon 6 homopolymer containing 3 weight percent Poly BD 600. This example illustrates that the addition of 3 weight percent Poly BD 600 (epoxy functionalized 1,3 polybutadiene) to nylon 6 worsens the oxygen transmission rate. Comparative example 4 is an experimental grade nylon 6/nanoclay blend (Nanomer I24TL organoclay polymerized in situ with nylon 6). Comparative example 5 is a commercially available nylon 6/nanocomposite from Unitika. Comparative example 6 is a commercially available semi-aromatic nylon 6 from Mitsubishi (MXD6). Comparative example 7 is MEXD6 containing 100 ppm cobalt. Comparative example 8 is a commercially available amorphous nylon (Grivory) available from EMS.

EXAMPLES 1–9

Examples 1–9 illustrate the effect of the oxygen binding system on the oxygen transmission rate of nylon 6. The examples illustrate the dramatic improvement in oxygen binding ability of the copolymers of this invention. In general for all examples the oxygen binding epoxy functionalized polybutadiene is nano/micro-phase separated from the nylon matrix with polybutadiene particle size on the order of 10–1000 nm. Example 1 is a copolymer of this invention containing 1 weight percent Poly BD-600 and 100 ppm by weight of cobalt. Samples of this example were prepared by methods 1,3,5 and 6 (described above). Example 2 is the same as example 1 except it contains 2 weight percent Poly BD 600. Example 3 is the same as example 1 except it contains 3 weight percent Poly BD 600. The oxygen transmission rate of example 3 decreases rapidly to near zero (3.4 E-3 cc mil/100 in$^2$/atm day after 2 days) and remains low (less than 0.1 cc mil/100 in$^2$/atm day) for five days. Example 4 is similar to example one except that compounding method 2 was used rather than compounding method 1 (each described above). Compounding method 1 is preferable because whiter pellets are obtained. Whiter pellets are the result of direct liquid injection of Poly BD 600/605E into the extruder in the absence of air which prevents oxidation of the polybutadiene). The oxygen transmission rate of example 4 results in very low oxygen transmission rate for 5 days. Examples 3 and 4 have an average 65 times lower oxygen transmission rate of over a 5 day period relative to comparative examples 1, 2 and 3. Example 5 is a copolymer of this invention containing three weight percent Poly BD 600 and 100 ppm by weight cobalt. This example, in which the cobalt and Poly BD 600 were added simultaneously to the same extruder (methods 4 and 7 described above), exhibited a low oxygen transmission rate for 3 days. Examples 3 and 5 were comparable in their oxygen scavenging behavior and were an average 25 times lower in oxygen transmission rate over a 5 day period relative to comparative examples 1, 2 and 3. This illustrates that the oxygen binding effect is observed in films prepared from two differently prepared starting materials, i.e. (1) a pellet blend approach (methods 1, 2 and 3) or (2) a fully compounded approach (method 4). Example 6 is the same as Example 3 except that Poly BD 605E (higher epoxy functionality relative to Poly BD 600) was used. Example 7 is similar to example eight except it contains 4 weight percent Poly BD 600. Example 8 is a copolymer of this invention containing 5 weight percent Hycar carboxy terminated polybutadiene (Hycar CTB). Samples were prepared by methods 2, 3, 5 and 7. The oxygen transmission rates measured on this example illustrate that Hycar CTB is a less effective oxygen binding polybutadiene. However, this example did exhibit lower oxygen transmission rates than comparative examples 1, 2 and 3. Example 9 is a co-extruded cast film example comprised of example three as a barrier layer between two PET outer layers. The sample was made with process steps 1, 3, 5 and 8. The outer layers of PET result in a film with a longer near zero oxygen transmission rate as compared with a neat film of the barrier layer (example 3). The oxygen transmission data for comparative example 1 and examples 6 and 9 are given in FIG. 1.

EXAMPLES 10–13

Figure 2:
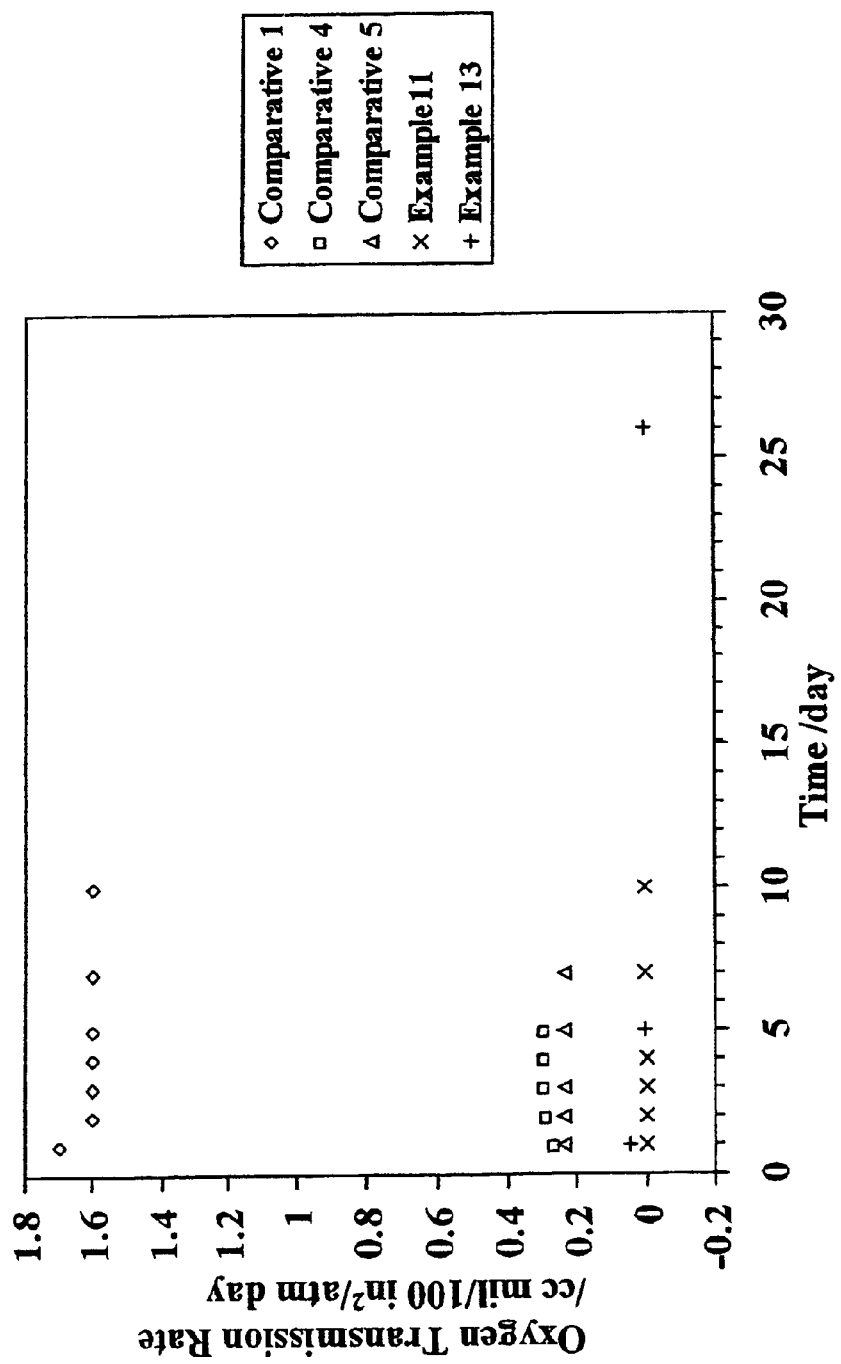
FIG. 2 shows a graph of the oxygen transmission data for Examples 11 and 13 and Comparative Examples 1, 4 and 5.

Examples 10–13 illustrate the effect of the oxygen binding system on the oxygen transmission rate of a nylon 6/organo-clay blend of this invention and a commercially available grade of nylon 6/organo-clay blend. The oxygen transmission data for examples 11 and 13 and comparative examples 1, 4 and 5 are given in FIG. 2. These examples illustrate the dramatic improvement in oxygen binding ability of the copolymers of this invention. Further, these examples demonstrate the synergistic effect of combining the oxygen binding system of this invention with a nylon 6 with organo-clay). The passive barrier afforded by the organo-clay combined with the active barrier of the oxygen binding copolymers result in a nylon 6 material with dramatically improved oxygen transmission properties. Example 10 is a copolymer of this invention containing 98 weight percent nylon 6/nanocomposite (containing 6 weight percent Nanocor Nanomer I24T), 2 weight percent Poly BD 600 and 100 ppm by weight cobalt and was prepared by methods 1, 3, 5 and 6. The oxygen transmission rate of example 10 is near zero for 10 days (test duration) and is 225 times less than comparative examples 1, 2 and 3. Example 11 is the same as example 10 except it contains 3 weight percent Poly BD 600. This example has a near zero oxygen transmission rate for 10 days (test duration) and is more than 900 times lower in oxygen transmission rate relative to comparative examples 1, 2 and 3. Example 12 was prepared as a blend of 77 weight percent nylon 6/organo-clay blend (containing 6 weight percent Nanocor Nanomer I24T), 20 weight percent amorphous nylon (EMS Grivory G21), 3 weight percent Poly BD 600 and 100 ppm cobalt This example exhibited a very low oxygen transmission rate for 16 days (test duration) and is at least 105 times lower in oxygen transmission rate relative to comparative examples 1, 2 and 3. Example 13 is a copolymer of this invention containing 95% nylon 6/organo-clay blend (commercially available from Unitika), 5 weight percent Poly BD 600 and 100 ppm cobalt. This example exhibited a very low oxygen transmission rate for 26 days (test duration) and is 300 times lower in oxygen transmission rate relative to comparative examples 1, 2 and 3. There exists a strong synergy when a passive barrier (organo-clay) is combined with an active barrier system (epoxy functionalized polybutadiene/cobalt). This may be the result of increased "tortuosity" for oxygen diffusing through the barrier material due to the elongated (high aspect ratio) clay particles and the presence of the highly dispersed and finely sized polybutadiene phase. Oxygen molecules are blocked by the clay particles and then forced to the epoxy functionalized polybutadiene phase where they become chemically bound.

EXAMPLE 14

Example 14 relate to poly(m-xylyleneadipamide), a polymer prepared from equimolar amounts of the two monomers (1) metaxylylene diamine and (2) adipic acid. This polymer is usually referred to as MXD-6. Example 14 was prepared by melt compounding 6 weight percent clay (Rheox) and MXD-6. Subsequent to this compounding step 3 weight percent Poly BD 600 and 100 ppm cobalt were added by methods 2, 3, 5 and 6. This sample exhibited a low oxygen transmission rate, and improved by a factor of 2 (in oxygen transmission rate) relative to comparative example 7, and by a factor of 4 relative to comparative example 6.

EXAMPLES 15–17

Examples 15–17 illustrate the effect of the oxygen binding system on amorphous nylon and blends of nylon and amorphous nylon. Example 15 is a copolymer of this invention containing 97 weight percent amorphous nylon (EMS Grivory G21), 3 weight percent Poly BD 600 and 100 ppm cobalt. Example 16 was prepared as 68 weight percent nylon 6 homopolymer blended with 29 weight percent amorphous nylon, 3 weight percent Poly BD 600 and 100 ppm cobalt (prepared by processes 1, 3, 5 and 6). Example 17 was prepared as 22 weight percent nylon 6, 67 weight percent amorphous nylon, 8 weight percent Nanomer I24TL organoclay, 3 percent Poly BD 600 and 100 ppm cobalt (prepared by processes 1, 3, 5 and 6). Each of these examples exhibited oxygen scavenging and resulted in lower oxygen transmission rates relative to comparative example 8.

EXAMPLES 18–21

Examples 18–21 illustrate the effect of the oxygen binding system on EVOH and blends of nylon and EVOH.

Example 18 is a blend containing 70 weight percent nylon 6, and 30 weight percent EVOH. Example 19 was prepared as 70 percent nylon 6/organo-clay blend (containing 6 weight percent Nanocor Nanomer I24T) and 30 weight percent EVOH Example 20 was prepared as 69 weight percent nylon 6, 28 weight percent EVOH and 3 weight percent Poly BD 600/Example 21 was prepared as 69 weight percent nylon 6/organo-clay blend (containing 6 weight percent Nanocor Nanomer I24T), 28 weight percent EVOH and 3 weight percent Poly BD 600. Examples 18–21 were prepared by process steps 1, 3, 5 and 6. The samples containing the oxygen scavenging copolymer exhibit oxygen scavenging and resulted in low oxygen transmission rates.

| Example No. | Process Steps | Wt. % PBD* | Wt. % Nylon 6 | PPM Co | OTR‡ Day 1 | OTR Day 2 | OTR Day 3 | OTR Day 4 | OTR Day 5 | OTR Day 7 | OTR Day 10 | OTR Day 16 | OTR Day 26 |
|---|---|---|---|---|---|---|---|---|---|---|---|---|---|
| Comparative 1 | 6 | 0 | 100 | 0 | 1.7 | 1.6 | 1.6 | 1.6 | 1.6 | N/A | N/A | N/A | N/A |
| Comparative 2 | 3,5,6 | 0 | 100 | 100 | 1.7 | 1.6 | 1.6 | 1.6 | 1.6 | N/A | N/A | N/A | N/A |
| Comparative 3 | 2,6 | 3 | 97 | 0 | 1.9 | 1.9 | 1.9 | 1.9 | 1.9 | 1.9 | N/A | N/A | N/A |
| Comparative 4 | 6 | 0 | 100[a] | 0 | 0.27 | 0.29 | 0.3 | 0.3 | 0.3 | N/A | N/A | N/A | N/A |
| Comparative 5 | 7 | 0 | 100[b] | 0 | N/A | N/A | N/A | N/A | N/A | 0.24 | N/A | N/A | N/A |
| Comparative 6 | 6 | 0 | 100[c] | 0 | 0.18 | 0.16 | 0.17 | 0.17 | N/A | N/A | N/A | N/A | N/A |
| Comparative 7 | 3,5,6 | 0 | 100[c] | 100 | 0.067 | 0.079 | 0.090 | 0.082 | N/A | N/A | N/A | N/A | N/A |
| Comparative 8 | 6 | 0 | 100[d] | 0 | 0.3 | 0.3 | 0.3 | 0.3 | N/A | N/A | N/A | N/A | N/A |
| 1 | 1,3,5,6 | 1 | 99 | 100 | 0.07 | 0.02 | 0.25 | 0.42 | N/A | N/A | N/A | N/A | N/A |
| 2 | 1,3,5,6 | 2 | 98 | 100 | 0.02 | 0.07 | 0.16 | 0.28 | 0.4 | 0.62 | | N/A | N/A |
| 3 | 1,3,5,6 | 3 | 97 | 100 | 0 | 0.0034 | 0.0086 | 0.026 | 0.097 | 0.54 | N/A | N/A | N/A |
| 4 | 2,3,5,7 | 3 | 97 | 100 | 0.0075 | 0.0069 | 0.0097 | 0.034 | 0.11 | 0.53 | N/A | N/A | N/A |
| 5 | 4,7 | 3 | 97 | 100 | 0 | 0.0091 | 0.046 | 0.15 | 0.38 | N/A | N/A | N/A | N/A |
| 6 | 1,3,5,6 | 3 | 97 | 100 | 1.2 | 0.65 | 0.027 | 0.016 | 0.012 | 0.018 | 0.14 | N/A | N/A |
| 7 | 1,3,5,6 | 4 | 96 | 100 | 0.0098 | 0 | 0.02 | 0.08 | 0.17 | 0.48 | 0.75 | N/A | N/A |
| 8 | 2,3,5,7 | 5†† | 95 | 100 | 0.14 | 0.68 | 0.98 | 1.1 | 1.3 | 1.4 | N/A | N/A | N/A |
| 9 | 1,3,5,8 | 3 | 97 | 100 | 0.008 | 0.008 | 0.008 | 0.008 | 0.009 | 0.01 | 0.028 | N/A | N/A |
| 10 | 1,3,5,6 | 2 | 98[a] | 100 | 0.05 | | 0.0063 | 0.0063 | 0.0076 | 0.007 | 0.008 | N/A | N/A |
| 11 | 1,3,5,6 | 3 | 97[a] | 100 | 0 | 0 | 0.00006 | 0.00026 | 0.0008 | 0.002 | 0.002 | N/A | N/A |
| 12 | 1,3,5,6 | 3 | 77[a],20[d] | 100 | 0.27 | 0.11 | 0.0084 | N/A | 0.010 | 0.014 | 0.027 | 0.042 | N/A |
| 13 | 2,3,5,7 | 5 | 95[b] | 100 | 0.044 | | | | | | 0.006 | | 0.006 |
| 14 | 2[f],3,5,6 | 3 | 97[c] | 100 | 0.014 | 0.028 | 0.037 | 0.040 | 0.046 | 0.044 | N/A | N/A | N/A |

Elf Atochem Poly BD 600 (unless otherwise noted)
†Elf Atochem PolyBD605E
††Goodrich Hycar CTB
‡Units cc mil/100 in$^2$/atm day, RH = 80–90% unless otherwise noted, Tested in air (21% O$_2$).
To convert to cc mm/m$^2$/atm day, multiply by 3.94 × 10$^{-1}$.
[a]Polymerized nylon6/nanoclay (Nanocor I24TL organoclay)
[b]Commercially available nylon 6 nanocomposite from Unitika
[c]Commercially available nylon 6 from MGC (MXD-6)
[d]Commercially available amorphous nylon from EMS (Grivory G21)
[e]Commercially available EVOH from EVAL Co.
[f]6% Rheox 2355 clay pre-blended in MXD6 prior to process step number 2.
[g]8% Nanomer I24TL organoclay added to twin screw extruder during process 1.

The foregoing examples illustrate the effect of the oxygen binding system on the oxygen transmission rate of the inventive nylon composition. While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A polyamide composition which comprises a polyamide homopolymer, copolymer, or blends thereof, at least one epoxy or anhydride functionalized, polyamide reactive, oxidizable polydiene or epoxy or anhydride functionalized, polyamide reactive, oxidizable polyether, an oxidation promoting metal salt catalyst, and a clay.

2. The composition of claim 1 which comprises a polyamide reactive, oxidizable polyether.

3. The composition of claim 1 which comprises a polyamide reactive, oxidizable polydiene.

4. The composition of claim 1 wherein the polyamide reactive, oxidizable polydiene comprises a polybutadiene.

5. The composition of claim 1 wherein the polyamide reactive, oxidizable polydiene comprises an epoxy or anhydride functional polybutadiene.

6. The composition of claim 1 wherein the polyamide reactive, oxidizable polydiene or oxidizable polyether is in the form of particles which are substantially uniformly distributed in the polyamide homopolymer, copolymer, or blend thereof.

7. The composition of claim 1 wherein the oxidizable polydiene or oxidizable polyether is in the form of particles whose average particle size is in the range of from about 10 nm to about 100 nm, and which particles are substantially uniformly distributed in the polyamide homopolymer, copolymer, or blend thereof.

8. The composition of claim 1 wherein said oxidation promoting metal salt catalyst comprises a metal carboxylate salt catalyst.

9. The composition of claim 1 wherein said oxidation promoting metal salt catalyst comprises a metal carboxylate salt catalyst selected from the group consisting of metal acetates, stearates, propionates, hexanoates, octanoates, benzoates, salicylates and cinnamates.

10. The composition of claim 1 wherein said oxidation promoting metal salt catalyst comprises a metal carboxylate salt catalyst selected from the group consisting of a cobalt, copper or ruthenium, acetate, stearate, propionate, hexanoate, octanoate, benzoate, salicylate or cinnamate, or combinations thereof.

11. The composition of claim 1 wherein the average platelet thickness of said clay is in the range of from about 1 nm to about 100 nm and the average length and average width of said clay are each in the range of from about 50 nm to about 500 nm.

12. The composition of claim 1 wherein the polyamide homopolymer or copolymer or blends thereof are aliphatic or aliphatic/aromatic.

13. The composition of claim 1 wherein said polyamide comprises nylon 6.

14. The composition of claim 1 wherein said polyamide comprises nylon 6,6.

15. The composition of claim 1 wherein said polyamide comprises nylon MXD6.

16. The polyamide composition of claim 1 in the form of a blend of said polyamide homopolymer, copolymer, or blends thereof, said at least one epoxy or anhydride functionalized, polyamide reactive, oxidizable polydiene or epoxy or anhydride functionalized, polyamide reactive, oxidizable polyether, said oxidation promoting metal salt catalyst, and said clay.

17. The polyamide composition of claim 1 in the form of a reaction product of said polyamide homopolymer, copolymer, or blends thereof, said at least one epoxy or anhydride functionalized, polyamide reactive, oxidizable polydiene or epoxy or anhydride functionalized, polyamide reactive, oxidizable polyether, said oxidation promoting metal salt catalyst, and said clay.

18. A process for producing a polyamide composition which comprises preblending a polyamide homopolymer, copolymer, or blends thereof with a clay, melting t polyamide-clay blend, and blending the molten polyamide-clay blend with at least one epoxy or anhydride functionalized polyamide reactive, oxidizable polydiene or epoxy or anhydride functionalized, polyamide reactive, oxidizable polyether and an oxidation promoting metal salt catalyst to form a mixture, and then cooling the mixture.

19. The process of claim 18 wherein said clay is characterized by an average platelet thickness in the range of from about 1 nm to about 100 nm and an average length and average width each in the range of from about 50 nm to about 500 nm.

20. The process of claim 19 wherein said oxygen promoting metal salt catalyst is a metal carboxylate salt catalyst selected from the group consisting of metal acetates, stearates, propionates, hexanoates, octanoates, benzoates, salicylates and cinnamates.

21. The process of claim 20 wherein said metal carboxylate salt catalyst is selected from the group consisting of a cobalt, copper or ruthenium, acetate, stearate propionate, hexanoate, octanoate, benzoate, salicylate or cinnamate, or combinations thereof.

* * * * *